Jan. 1, 1963 E. W. PUGH 3,071,756

MAGNETIC MEMORY

Filed April 11, 1961

INVENTOR
EMERSON W. PUGH

BY

ATTORNEY 3,071,756

MAGNETIC MEMORY

Emerson W. Pugh, Ossining, N.Y., assignor to International Business Machines Corporation, New York, N.Y., a corporation of New York Filed Apr. 11, 1961, Ser. No. 102,184
14 Claims. (Cl. 340—174)

This invention relates to magnetic memories, and more particularly to a non-coincident current selection magnetic memory wherein the basic storage elements exhibit a biaxial anisotropic characteristic.

Information bit rate and memory capacity are two important factors which determine the efficiency of an electronic computer. After development of the first large scale computers, the continuous demand to increase these factors, combined with the simultaneous desire to reduce costs, very soon led to a careful search for suitable phenomena in solid state physics. In magnetics, on which present day computers rely so strongly, great hopes are placed on the excellent switching and storage properties of thin magnetic films, which may allow the limitations of existing magnetic materials to be pushed back by several orders of magnitude.

Thin magnetic films have received increasing attention during the past few years as prospective computer components. The decrease in total magnetizing energy and, with decreasing thickness and volume, the corresponding reduction of eddy current losses as well as higher switching speeds attainable, are the primary factors which have led to the investigation of thin magnetic films. These thin magnetic films are layers of magnetic material deposited onto a substrate, and they generally have a thickness from 100–2000 A. The choice of thin magnetic films was originally motivated by higher switching speeds, the reduction of eddy currents, and the reduced magnetic energy corresponding to the small volume. The fact that cost reducing mass production techniques can be employed in the preparation of thin magnetic film circuits is another important advantage over the use of conventional magnetic units. Thin magnetic films may be produced in different ways, for example by evaporation in vacuum, by a cathode sputtering in a gaseous atmosphere, and by electroplating as discussed by T. D. Knorr, in Technical Report #3, September 1958, prepared by Case Institute of Technology, Atomic Energy Division, and entitled "Geometric Dependence of Magnetic Anisotropy in Thin Iron Films." These films are produced to exhibit uniaxial magnetic anisotropy. The term uniaxial magnetic anisotropy is understood to mean that tendency of the magnetization throughout the film to align in one preferred distinct direction, or else in a direction antiparallel to the preferred direction. This preferred direction is termed "easy direction," and that perpendicular to the easy direction is termed "hard direction." Uniaxial anisotropy is generated, for example, by the evaporation of Permalloy material, preferably of the composition of 80% nickel and 20% iron, onto a heated substrate in the presence of a static magnetic field parallel to the plane of the substrate. During this process, the magnetic field induces the easy direction of magnetization. The results of such a fabrication is that the film, without any external fields, behaves similar to a single domain, i.e. all magnetization vectors point to the same direction. It should be noted, at this point, that anisotropic differs from isotropic material in that isotropic material exhibits the same property or properties in every direction whereas anisotropic films do not exhibit the isotropic phenomena, that is, isotropic films or mediums exhibit no preferred direction of magnetization or otherwise, while anisotropic medium or films, exhibit some preferred direction. Where, as discussed above, the film is said to exhibit uniaxial anisotropic characteristics, such a medium then exhibits a single axis or anti-parallel preferred directions, along which a particular phenomena takes place, that is opposite remanent orientation states for magnetic flux. It is this characteristic of thin film elements made of magnetic material which is utilized to store binary information, in that, the opposite oriented stable remanent directions of flux are utilized to designate the different binary values 0 and 1.

A. V. Pohm et al., suggested the use of planar magnetic thin film elements exhibiting uniaxial anisotropy in an article entitled "A Compact Coincident-Current Memory," PROC. of the Eastern Joint Computer Conference, New York, N.Y., December 1956, pp. 120–124, while L. P. Hunter suggested the use of toroidal thin film-elements exhibiting uniaxial anisotropy for a coincident-current memory in a copending application Serial No. 614,654, assigned to the assignee of this application. Others, such as Eric E. Bittmann, in an article entitled "Using Thin Films in High-Speed Memories," appearing in Electronics, June 5, 1959; S. Methfessel et al. in an article entitled "Thin Magnetic Films," UNESCO, PROC. of the International Conference on Information Processing, Paris, June 15–20, 1959; and K. Raffel et al., in an article entitled "A Computer Using Magnetic Films," UNESCO, PROC. of the International Conference on Information Processing, Paris, June 15–20, 1959, also proposed the use of such uniaxial anisotropic magnetic thin film elements in coincident-current memories.

It has been found, that a non-coincident current selection memory may be realized by employing magnetic thin film elements exhibiting a biaxial anisotropic characteristic. Such elements differ from a uniaxial anisotropic element described above, in that they exhibit two axes of "easy" magnetization. More specifically, the magnetic element employed, exhibits a biaxial anisotropic characteristic defining opposite remanent stable states of flux orientation along a first easy axis of magnetization, and angularly displaced from this first axis, preferably at 90°, opposite stable remanent states of flux orientation along a second easy axis of magnetization. The opposite remanent stable states of flux orientation along the first easy axis of magnetization are employed to designate the different binary values of 0 and 1, while any one of the opposite remanent stable states of flux orientation along the second easy axis of flux orientation is employed as a preselect stable state.

In operation, the biaxial anisotropic magnetic element described above is switched to a preselect stable state to read out the information retained therein, and thereafter, in non-time coincidence with the switching of same element to the preselect stable state, the element is switched to a predetermined one of its stable states of orientation along the first easy axis for writing information therein. The field applied to the element for reading is directed transverse to the first easy axis of the element, while the field applied for writing is applied parallel to the first easy axis of the element. The magnitude of the field applied to the element for writing a 0 or 1, is sufficient to switch the element from a preselect oriented stable state to either one of the binary valued oriented stable states, but is insufficient to switch the element from one binary valued stable state to another.

Employing magnetic elements exhibiting a biaxial anisotropic characteristic as described above, allows construction of a word organized non-coincident current selection memory avoiding the difficulties of time coincidence associated with the coincident type memories discussed in the above articles.

It is then a prime object of this invention to provide an improved magnetic memory wherein selection is accomplished by non-coincident current techniques.

Another object of this invention is to provide an improved non-coincident current selection magnetic memory employing magnetic elements exhibiting a biaxial anisotropic characteristic.

Still another object of this invention is to provide a non-coincident current selection magnetic memory employing magnetic elements exhibiting a biaxial anisotropic characteristic, wherein the elements define a portion of the flux path only when the remanent magnetization thereof is aligned in one axis of easy magnetization.

Another object of this invention is to provide a high speed magnetic non-coincident current selection memory employing economical and compact magnetic thin film elements exhibiting biaxial anisotropic characteristics.

Still another object of this invention is to provide a high speed non-coincident current selection magnetic memory employing biaxial anisotropic magnetic thin film elements which define a portion of a flux path only when the magnetization thereof is oriented along any axis of easy magnetization.

Another object of this invention is to provide an improved memory element for use in a non-coincident current selection memory which element is magnetic and exhibits a simple biaxial anisotropic characteristic.

Another object of this invention is to provide a novel and improved magnetic memory element exhibiting a complex biaxial anisotropic characteristic capable of being used in a non-coincident selection memory.

The foregoing and other objects, features and advantages of the invention will be apparent from the following more particular description of preferred embodiments of the invention, as illustrated in the accompanying drawings.

Figure 1:
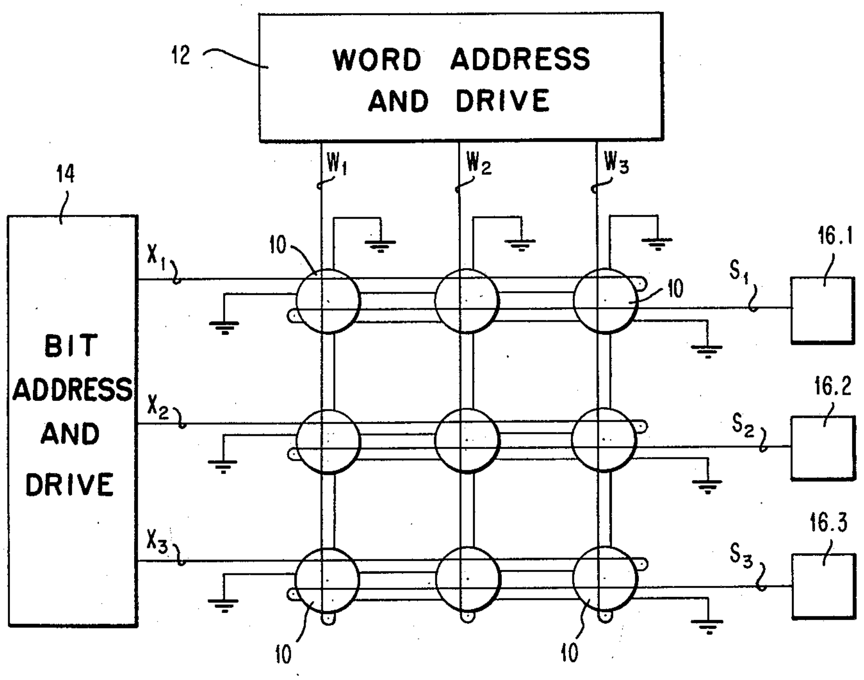
FIG. 1 illustrates a non-coincident current selection magnetic memory according to one embodiment of this invention.

Referring to the FIG. 1, there is shown a schematic illustration of a two dimensional word organized memory. The memory of FIG. 1 is provided with a plurality of magnetic elements 10 arranged in word columns and bit rows. Each column of elements is coupled by one of three word drive windings $W_1$–$W_3$, which is in turn connected to a word address and drive means 12. Each of the different rows of elements 10 is coupled by a respective bit drive winding $X_1$–$X_3$, which windings in turn are connected to a bit address and drive means 14. Each row of elements 10 is further coupled by a respective sense winding $S_1$–$S_3$, having one end connected to ground and the other end connected to a respective load 16.1–16.3.

Figure 2:
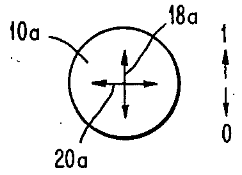
FIG. 2 illustrates one embodiment of a magnetic element exhibiting biaxial anisotropic characteristics as contemplated for use in the memory of FIG. 1.
Figure 3:
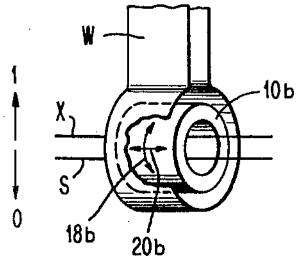
FIG. 3 illustrates another embodiment of another magnetic element exhibiting biaxial anisotropic characteristics capable of, and contemplated for, use in the memory of FIG. 1.

Referring now to both the FIGS. 2 and 3, different embodiments of magnetic elements 10*a* and 10*b*, respectively, are shown, either one of which may be employed in the memory of FIG. 1 for the basic storage cell 10. The elements 10*a* and 10*b* exhibit a first easy axis of magnetization 18*a* and 18*b*, and angularly displaced therefrom, preferably by 90°, a second easy axis of magnetization 20*a* and 20*b*, respectively. Elements such as the elements 10*a* and 10*b* exhibiting a pair of easy axes 18 and 20, are referred to as biaxial anisotropic elements, that is, elements in which the remanent magnetization therein lies along either one of the two different axes. The element 10*a* differs from the element 10*b* in that the element 10*a* defines a portion of a flux path only when the remanent magnetization thereof is oriented along any axis thereof, while the element 10*b* defines a portion of a flux path only when the remanent magnetization therein is oriented along one easy axis, the axis 20*b*. Stated another way, the element 10*b* defines a closed flux path only when the remanent magnetization thereof is oriented along a predetermined one of the easy axes. The element 10*a* of FIG. 2 is amenable to more compact packaging for memory arrays, while the element 10*b* of FIG. 3 has the advantage of providing a closed flux path to provide better coupling between input and output lines.

As contemplated for use in the memory of FIG. 1, the element 10*a* or 10*b* stores different binary values by use of the different orientation directions along the easy axis 18*a* or 18*b*, respectively, shown by arrows labelled 1 and 0. The second easy axis 20 of the elements 10 is employed as a preselect orientation state, or stated otherwise, a prewrite orientation state.

Figure 4:
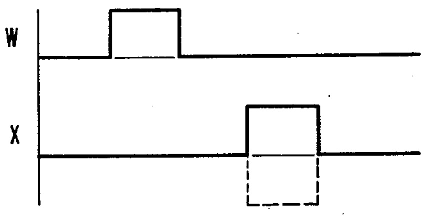
FIG. 4 illustrates a pulse program for operation of the memory of FIG. 1.

Referring to the FIG. 4, a pulse program for energization of the different coordinate address lines W and X is shown for operation of the memory of FIG. 1. Referring to the FIGS. 1, 2, 3 and 4, assume information is already stored in the memory and each of the elements 10 is positioned in the memory so that the axis 18 is in alignment with word address drive lines $W_1$–$W_3$, while the axis 20 is in alignment with the bit address drive lines X. When an information word is to be stored in a particular address location, the word information stored in the particular address location is first read out and then the desired word information to be stored is written into this location. Accordingly, a selected one of the word drive lines $W_1$–$W_3$ is energized as shown in the FIG. 4, to orient the magnetization of each of the elements 10 coupled thereby along the axis 20, each element now being established in the preselect or prewrite remanent state. Thereafter, all the bit row drive lines $X_1$–$X_3$ are energized as shown in FIG. 4 by either a positive or negative polarity impulse. Energization of a drive line X by a positive polarity impulse switches an element 10 in the preselect oriented state to orientation along the axis 18 defining the 1 stable state, while energization of a drive line X with a negative polarity impulse switches an element 10 in the preselect orientation state to orientation along the axis 18 defining the 0 stable state.

Anisotropic magnetic materials are defined by their energy equations. The energy equation for a simple biaxial anisotropic element, which essentially describes a single plane element is:

$$E_B = \tfrac{1}{4} K_B \sin^2 2\theta$$

where $K_B$ is the biaxial anisotropy constant for the element and $\theta$ is the angle between the magnetization direction and one of the two easy axes of the element. Uniaxial anisotropic elements are expressed in a similar form as follows:

$$E_u = K_u \sin^2 \theta$$

where $K_u$ is the uniaxial anisotropy constant for the element and $\theta$ is the angle between the magnetization direction and the single easy axis of the element. In every case, for a biaxial element to exist, the biaxial anisotropy constant $K_B$ must be larger than $K_u$. Thus $K_B > K_u$. This relationship is of importance when considering the use of different elements in the memory of FIG. 1, as will become apparent from the subsequent discussion.

In order to cause rotational switching in a biaxial element, such as the elements 10*a* or 10*b* shown in the FIGS. 2 and 3, respectively, from one stable state to another along the same easy axis, for example rotational switching from the 0 state along the axis 18 to the 1 state, a minimum field must be applied along this axis. This minimum field is dependent upon the anisotropy constants of the element and a saturation magnetization constant for the material of the element. A field applied by an X bit drive line will hereinafter be referred to as $H_x$, and the field which must be applied by any one of the X bit drive lines of FIG. 1 in order to completely rotate the element from one binary storage state to another is given by the relationship:

$$H_R = \frac{2K_B}{M}$$

where $H_R$ is the field necessary for rotational switching, and M is the saturation magnetization constant for the material. It has been found that for a "simple" biaxial element, the field which must be applied to cause rotation of the magnetization by 90°, such as performed by any one of the word address lines $W_1$–$W_3$ as described above, the relationship is given in the form:

$$H_{90°} = (0.27)\frac{2K_B}{M}$$

It should be noted, that by "simple" biaxial elements what is meant is elements for which $K_u=0$, that is, elements whose different easy axes exhibit substantially similar energy values, or stated otherwise, the two easy axes are equally stable for the remanent magnetization.

Thus a field $H_w$ applied by the word address lines $W_1$–$W_3$ is at least $(0.27)2K_B/M$, while similarly, the field $H_x$ applied by the bit address lines $X_1$–$X_3$, is at least $(0.27)2K_B/M$ for the memory of FIG. 1.

It has been found that elements may be fabricated which, while exhibiting biaxial anisotropic characteristics, one of the easy axes is more pronounced than the other, or in other terms, one easy axis is more stable for remanent magnetization than the other. Such elements are termed "complex" biaxial anisotropic elements for which $K_u \neq 0$. For a "complex" biaxial anisotropic element, the energy equation is of the form:

$$E_{CB} = \tfrac{1}{4}K_B \sin^2 2\theta + K_u \sin^2 \theta$$

where $K_B > K_u$. This equation states that one axis is more dominant than the other, the axis where $\theta$ is equal to 0° and 180°. For values of $K_u$ equal to or greater than $K_B$, an element described by the relationship $E_{CB}$ above, loses its biaxial characteristic and has only one easy axis, thus providing a uniaxial anisotropic characteristic. Where the element is a complex biaxial anisotropic element, the field required to switch the element from one stable direction to another along the dominant easy axis is given by the equation:

$$H_{cRD} = 2\frac{(K_B + K_u)}{M}$$

The field required to rotationally switch the complex element from its dominant axis to its less dominant axis, a rotation of 90°, is then dependent upon the relationship of $K_u$ to $K_B$, that is $K_u/K_B$ and the switching fields become complex as is shown in a Table I below.

In the Table I, the first column defines, numerically, the relationship of $K_B/K_u$ for different biaxial elements. The first row of this column describes a simple biaxial anisotropic element, while the remaining rows describe complex biaxial anisotropic elements. The second column of table describes the factor by which the relationship $2K_B/M$ must be multiplied to rotationally switch the element by 180° along its dominant axis, except in the case of the simple biaxial anisotropic element where both axes have substantially identical stable magnetization axes; the third column represents that factor by which $2K_B/M$ must be multiplied for a particular $K_u/K_B$ element to rotationally switch from the dominant to the less dominant axes of the element, a rotational switch of 90°; and the fourth column describes that factor by which the term $2K_B/M$ must be multiplied to provide the field necessary to rotationally switch the element 90° from the less dominant axis of the element.

*Table I*

| $K_u/K_B$ | $H_{CRD}$ | H 90° | H (90°) to 1 or 0 |
|---|---|---|---|
| 0 | 1 | 0.27 | 0.27 |
| .3 | 1.3 | 0.38 | 0.15 |
| .6 | 1.6 | 0.52 | 0.07 |
| 1.0 | or larger | not biaxial | |

Thus, a complex biaxial anisotropic element may also be utilized in the memory of FIG. 1. If however, a complex biaxial element is used, the dominant axis of the element should be employed as the storage axis, that is, the axis utilized to store the binary 0 and 1 bits similar to the axis 18 of the elements 10*a* or 10*b* in FIG. 2 or 3, respectively. The reason why the dominant axis of a complex biaxial element should be employed as the storage axis will become clear subsequently.

In each instance above, a minimum field must be applied to a simple or complex biaxial anisotropic element for 90° rotational switch and has been specified above. If a field of large magnitude were employed for switching any one biaxial element described above from orientation along one axis to orientation along another axis, such fields would cause registration of erroneous information in the memory of FIG. 1. For example, consider the memory of FIG. 1 wherein each element 10 is the element 10*a* or 10*b* as described in the FIG. 2 or 3, respectively. In the case where the biaxial anisotropic elements are "simple", as described above, a selected word is addressed and the particular word address drive line $W_1$–$W_3$ is energized to rotate all the elements 10 coupled thereby to a preselect remanent state, causing orientation along the easy axis 20. Thereafter, all of the bit drive lines $X_1$–$X_3$ are energized by positive or negative polarity impulses to establish the different elements 10 in the 0 or 1 stable state, orienting the magnetization of the elements 10 along the axis 18. Assume that the field $H_x$ applied to the elements 10 is greater than $$(0.27)\frac{2K_B}{M}$$

A similar field is applied to all the remaining elements 10 in the matrix. This field must be less than $$2\frac{K_B}{M}$$

since any element 10 in other non-selected words oriented antiparallel to the field $H_x$ will switch to an opposite stable state of orientation along its axis 18. It is well recognized that in most anisotropic magnetic elements, the coercive force threshold for wall motion switching, as opposed to rotational switching, is less than that of rotational switching. Thus, where the wall motion threshold of the element is $H_c$, as seen along the easy axis of the element, $H_c < H_R$. Therefore, even though the field $H_x$ applied to all the elements of a row is less than the rotational switching threshold $H_R$, this field must also be less than the coercive force threshold for wall motion switching $H_c$ or else elements having their magnetization directed antiparallel to the applied field $H_x$ will switch by wall motion. Although most anisotropic magnetic elements exhibit a threshold $H_c$ for wall motion switching which is smaller than the threshold $H_R$ for rotational switching, the converse may also be exhibited, that is the threshold $H_R$ is less than the threshold $H_c$. Therefore, a limitation of the maximum field $H_x$ which may be applied in the memory of FIG. 1, is that this field must be less than the wall motion threshold $H_c$ and less than the rotational switching threshold $H_R$ of the element along the axis 18.

That is, $H_c > H_x < H_R$. Further, the field $H_x$ must have a minimum magnitude of $$(0.27)\frac{2K_B}{M}, \text{ i.e. } H_x > (0.27)\frac{2K_B}{M}$$

The limitation of the applied field $H_x$ has been described above, consider now the field $H_w$ applied by the word address drive lines $W_1$–$W_3$. During application of the field $H_w$ to all the elements 10 in a selected word, these elements rotationally switch to orientation along the axis 20. At this time, the information stored in the different elements is read out on the different sense lines $S_1$–$S_3$ and applied to the different load 16.1–16.3, respectively. The polarity of the impulse induced on the different sense lines $S_1$–$S_3$, defines the binary information previously stored in a particular bit location. For example, if an element 10 is storing a binary 0, when this element is switched to orientation along the axis 20, a negative impulse is induced on the sense winding S coupled thereto. Conversely, if an element 10 is storing a binary 1, when this element is switched to a preselect orientation stable state along the axis 20, a positive impulse is induced on the sense line S coupled thereto. If the field $H_w$ applied to the element 10 is large, then a voltage of large magnitude is induced on the sense windings $S_1$–$S_3$ whose polarity is either positive or negative depending upon the previous storage history of the particular elements. Each of the sense lines $S_1$–$S_3$ also couple all the remaining bits 10 in the memory in such a manner as to apply a field $H_x$ to the remaining elements 10. If the field $H_x$ applied to any one of the remaining elements 10 in the memory of FIG. 1 is large enough, then any element coupled which is not being read out and oriented antiparallel to this applied field will switch to an opposite information storage state. As discussed above, therefore, the field $H_x$ applied to any of the remaining elements by readout of a selected word must be less than the coercive force threshold $H_c$ of the material and less than the rotational switching threshold $H_R$ of the material, whichever is less. Therefore, in order to avoid deleterious effects, the field $H_w$ should be held to a predetermined maximum. This maximum is determined by the coupling characteristics of the sense lines $S_1$–$S_3$ to the different elements 10, the length of line S between the different storage elements 10 and stray field coupling, if any, between elements. In fabrication of any one array each of these different entities must be accounted for, however, a field $H_w$ may be applied which is in excess of the rotational switching threshold $H_R$ for the element as measured along the axis 20, which as stated above for a simple biaxial element is $$2\frac{K_B}{M}$$

since in practice the coupling characteristics discussed above are small.

If, as stated above, a "complex" rather than a "simple" biaxial element is chosen for the storage element 10 in the memory of FIG. 1, the dominant axis of this "complex" biaxial element should be used as the storage axis. This will become clear by considering the converse, i.e. considering use of such a "complex" biaxial anisotropic element in the memory of FIG. 1 where the dominant axis is employed as the preselect orientation stable state and the less dominant axis is employed as the storage axis for binary information. According to the Table I above, the field necessary to rotate the magnetization of a complex element from its less dominant orientation is in one instance, where $K_u/K_B$ is 0.3, a little less than half the field necessary to switch the element from orientation along its dominant axis to orientation along the less dominant axis; while in the other instance, where $K_u/K_B$ is 0.6, a field having a magnitude a little less than one seventh the field necessary to switch the element from orientation along its dominant axis to orientation along its less dominant axis. Manifestly, if a column of such elements their magnetization oriented along the dominant axis and the bit drive lines X were energized, the field necessary to switch the elements oriented along the dominant axis to orientation along the less dominant axis approaches the field required to completely reverse the magnetization of the element along the less dominant axis by domain wall motion and in some instances exceeds this threshold. Thus, other elements in the memory of FIG. 1 having their magnetization oriented along the less dominant axis 18 to which an antiparallel field $H_x$ is applied may be reversed by domain wall motion and thus enter erroneous information. Further, consider operation of the memory when the field $H_w$ is applied to all elements 10 coupled by a selected word drive line $W_1$–$W_3$ to orient the magnetization of the elements along their dominant axis. The field $H_x$ applied to the remaining elements of the memory by the signal induced on the sense lines $S_1$–$S_3$ has a probability of switching the nonselected elements having their remanent orientation states oriented antiparallel to this applied field $H_x$.

Magnetic elements exhibiting a biaxial anisotropic characteristic may be fabricated by employing the natural anisotropy characteristics of crystallographically oriented materials.

Crystallographically oriented magnetic thin films exhititing a biaxial anisotropic characteristic may be grown epitaxially on NaCl, MgO, or the similar single crystal materials. Well oriented films 1 cm. square may be fabricated by evaporating a nickel-iron alloy of 80% nickel-20% iron, on to such a crystal as NaCl, at temperatures ranging from 250° to 400° C. The crystal NaCl is particularly attractive since films may be floated off on water and subsequently picked up on previously prepared strip wiring arrays. A sandwich array structure may be fabricated by picking up one single crystal film on each of two flat conducting surfaces (for use as ground planes). Crossed bit, word, and sense lines may then be evaporated, electroplated, or physically placed on one of the thin film sheets. Pressing two arrays of such films together with the wiring in the center, a sandwich array of biaxial elements is obtained.

It is well know that if a sheet of thin foil of nickel-iron alloy is severely cold rolled, to about 95% reduction or more, and then recrystallized with an anneal at about 950° C., a (100) plane lies in the rolling plane with a [001] direction parallel to the roll direction, as set forth in a book entitled "Ferromagnetism" by Richard M. Bozorth, published by the D. Van Nostrand Co., Inc., pages 586–590. The cubic anisotropy of face centered Ni-Fe is such that the two easy axes are, respectively, parallel and perpendicular to the roll direction for less than about 63% nickel and are at 45° to these directions for compositions containing more than 75% nickel. Between these two compositions, the directions of the easy axes are determined by the state of ordering. The degree of alignment from one region in a sheet to another has been found to be excellent.

Although the major advantage of elements exhibiting a biaxial anisotropic characteristic is realized in a two dimensional memory as shown in FIG. 1, it should be noted that other dimensional memories may be constructed by use of coincident current selection techniques along lines parallel to the word drive lines and nondestructive readout of such a memory may also be achieved by applying a drive to any selected word drive line which applies a field directed along the axis 20 which is of a magnitude to insure some rotational switching but small enough to insure rotation of the magnetization back to the initial stable state rather than to the preselect orientation direction.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory comprising a plurality of magnetic elements arranged in columns and rows, a plurality of column conductors each coupling all the elements in different columns, a plurality of row conductors each coupling all the elements in different rows, each said element exhibiting a biaxial anisotropic characteristic defining different easy axes of remanent flux orientation whose magnetic energy E is given by an equation:

$$E=\frac{1}{4}K_B \sin^2 2\theta + K_u \sin^2 \theta$$

where $K_B$ is a biaxial anisotropy constant for the element
$K_u$ is a uniaxial anisotropy constant for the element and $\theta$ is an angle between a magnetization direction and an easy axis of the element, said equation defining opposite remanent states of flux orientation along a first easy axis and in quadrature therewith, opposite remanent states of flux orientation along a second easy axis, each said element further exhibiting different coercive force thresholds $H_c$ and $H_R$ for reversal of flux orientation along said first easy axis by domain wall motion and domain rotation, respectively, first means including a selected column conductor for applying a field along the second easy axis of all the elements in a selected column having a minimum magnitude dependent upon a ration $K_u/K_B$ of the elements sufficient to switch the magnetization of said elements in the selected column from orientation along the first easy axis to remanent orientation along said second easy axis, and second means including all said row conductors operative in non-coincident time relationship with said first means for thereafter applying a field to all the elements in all said rows directed along the first easy axis thereof having a magnitude less than the coercive force thresholds $H_c$ and $H_R$ of said elements but sufficient to switch all the elements in said selected column from orientation along said second easy axis to a stable oriented state along said first easy axis.

2. A memory comprising a plurality of magnetic elements arranged in columns and rows, a plurality of column conductors each coupling all the elements in different columns, a plurality of row conductors each coupling all the elements in different rows, each said magnetic element exhibiting a biaxial anisotropic characteristic defining different easy axes of remanent flux orientation whose magnetic anisotropy energy E is given by an equation:

$$E=\frac{1}{4}K_B \sin^2 2\theta + K_u \sin^2 \theta$$

where $K_B$ is a biaxial anisotropy constant for the element
$K_u$ is a uniaxial anisotropy constant for the element and $\theta$ is an angle between a magnetization direction and an easy axis of the element, said equation defining opposite remanent states of flux orientation along a first easy axis of magnetization, and in quadrature therewith, opposite remanent states of flux orientation along a second easy axis of magnetization, where the magnetic anisotropy energy of said second axis is greater than the magnetic anisotropy energy of said first axis, each said magnetic element further exhibiting different coercive force thresholds $H_c$ and $H_R$ for reversal of flux orientation along said first easy axis by domain wall motion and domain rotation, respectively, first means including a selected column conductor for applying a field to all the elements in a selected column directed transverse to the first easy axis of the elements in the selected column having a minimum magnitude dependent upon a ratio $K_u/K_B$ of the element but sufficient to switch the magnetization of all the elements in the selected column from orientation along the second easy axis, and means including all the row conductors operative in non-coincident time relationship with said first means for applying a field to all the elements directed along the first easy axis of said elements of a magnitude insufficient to exceed the coercive force thresholds $H_c$ and $H_R$ of said elements but sufficient to switch all said elements in said selected column from orientating along said second easy axis to stable remanent orientation along said first easy axis.

3. A memory comprising a plurality of magnetic elements arranged in columns and rows, a plurality of column conductors each coupling all the elements in different columns, a plurality of row conductors each coupling all the elements in different rows, each said element exhibiting a biaxial anisotropic characteristic defining different easy axes of remanent flux orientation whose energy E is given by an equation:

$$E=\frac{1}{4}K_B \sin^2 2\theta$$

where $K_B$ is a biaxial anisotropy constant for the element and $\theta$ is an angle between a magnetization direction and an easy axis of the element, said equation defining opposite remanent states of flux orientation along a first easy axis of magnetization and in quadrature therewith, opposite remanent states of flux orientation along a second easy axis of magnetization, each said element further exhibiting different coercive force thresholds $H_c$ and $H_R$ for reversal of flux orientation along said first easy axis by domain wall motion and domain rotation, respectively, first means including a selected column conductor for applying a field to all the elements in the selected column directed along the second easy axis of said selected elements of a magnitude in excess of 0.27 $H_R$ to switch said selected elements to stable flux orientation along said second easy axis, and means including all said plurality of row conductors operative in non-coincident time relationship with said first means for thereafter applying a field to all said plurality of elements directed along the first easy axis of said elements the magnitude of which is insufficient to overcome the coercive force thresholds $H_c$ and $H_R$ of said elements but in excess of 0.27 $H_R$ to switch the magnetization of said selected column of elements to stable remanent orientation along said first easy axis.

4. A magnetic memory comprising, a plurality of magnetic elements arranged in columns and rows, a plurality of column conductors each coupling all the elements in different columns, a plurality of row conductors each coupling all the elements in different rows, each said element exhibiting a biaxial anisotropic characteristic defining opposite remanent states of flux orientation along a first easy axis of magnetization and in quadrature therewith, opposite remanent states of flux orientation along a second easy axis of magnetization, first means including one of said plurality of column conductors for applying a field along the second easy axis of all the elements in a selected column to orient the magnetization of said elements in said selected column along said second easy axis, and further means including all the row conductors operative in non-coincident time relationship with said first means for thereafter applying a field of predetermined magnitude along the first easy axis of said elements to establish all the elements in said selected column to stable orientation along said first easy direction without disturbing the state of the remaining non-selected elements.

5. In a circuit for storing binary information, a magnetic element exhibiting a biaxial anisotropic characteristic defining different easy axes of remanent flux orientation whose energy E is given by an equation:

$$E=\frac{1}{4}K_B \sin^2 2\theta + K_u \sin^2 \theta$$

where $K_B$ is a biaxial anisotropy constant for the element $K_u$ is a uniaxial anisotropy constant for the element and $\theta$ is an angle between a magnetization direction and an easy axis of the element, said equation defining opposite remanent states of flux orientation along a first easy axis of magnetization and in quadrature therewith, opposite remanent states of flux orientation along a second easy axis of magnetization for said element, first means including a first conductor coupling said element for applying a field of predetermined magnitude along the second easy axis of said element to switch said element from orientation along said first easy axis to remanent orientation along said second easy axis, and further means including a second conductor coupling said element operative in non-coincident time relationship with said first means for thereafter applying a field of predetermined magnitude along said first easy axis to switch said element to stable orientation along said first easy axis.

6. In a circuit for storing binary information comprising, a magnetic element exhibiting a biaxial anisotropic characteristic refining different easy axes of remanent flux orientation whose energy E is given by an equation:

$$E=\tfrac{1}{4}K_B \sin^2 2\theta$$

where $K_B$ is a biaxial anisotropy constant for the element and $\theta$ is an angle between a magnetization direction and an easy axis of the element, said equation defining opposite remanent states of flux orientation along a first easy axis of magnetization and in quadrature therewith, opposite remanent states of flux orientation along a second easy axis of magnetization for said element, first means including a first conductor coupling said element for applying a field of predetermined magnitude directed along the second easy axis of said element to switch the magnetization of said element from orientation along said first easy axis to remanent orientation along said second easy axis, further means including a second conductor coupling said element operative in non-coincident time relationship with said first means for thereafter applying a field of predetermined magnitude directed along the first easy axis of said element to switch the magnetization of said element from orientation along said second easy axis to remanent orientation along said first easy axis.

7. A storage element comprising a magnetic element exhibiting a biaxial anisotropic characteristic defining different easy axes of remanent flux orientation whose energy E is given by an equation:

$$E=\tfrac{1}{4}K_B \sin^2 2\theta+K_u \sin^2 \theta$$

where $K_B$ is a biaxial anisotropy constant for the element $K_u$ is a uniaxial anisotropy constant for the element and $\theta$ is an angle between a magnetization direction and an easy axis of the element, said equation defining opposite remanent states of flux orientation along a first easy axis of magnetization and displaced 90° therefrom opposite remanent states of flux orientation along a second easy axis of magnetization for said element, a plurality of windings coupling said element, and means including said plurality of windings for sequentially switching the magnetization of said element from remanent orientation along said first axis to remanent orientation along said second axis and thereafter to remanent orientation along said first axis.

8. A magnetic storage element comprising a magnetic element exhibiting a biaxial anisotropic characteristic defining different axes of remanent flux orientation whose energy E is given by an equation:

$$E=\tfrac{1}{4}K_B \sin^2 2\theta$$

where $K_B$ is a biaxial anisotropy constant for the element and $\theta$ is an angle between a magnetization direction and an easy axis of the element, said equation defining opposite remanent states of flux orientation along a first easy axis of magnetization and displaced 90° therefrom opposite remanent states of flux orientation along a second easy axis of magnetization for said element, a plurality of windings coupling said element, and means including said pulrality of windings for sequentially switching the magnetization of said element from remanent orientation along one of said easy axes to remanent orientation along the other of said easy axes and thereafter to remanent orientation along said one easy axis.

9. Apparatus for storing binary information comprising a cylindrically shaped magnetic element exhibiting a biaxial anisotropy characteristic defining opposite remanent stable states of flux orientation along a first easy axis of magnetization, and in quadrature with said first easy axis opposite remanent stable state of flux orientation along a second easy axis of magnetization, said element defining a portion of flux path only when the remanent magnetization thereof is oriented along said second easy axis, first means including a first conductor coupling said element in alignment with said first easy axis for applying a field along said second easy axis to switch said element from orientation along said first easy axis to a stable oriented state along the second easy axis and second means including a second conductor coupling said element in quadrature with said first conductor operative in non-coincident time relationship with said first means for thereafter applying a field along said first easy axis to switch said element from orientation along said second easy axis to stable orientation along said first easy axis.

10. Apparatus for storing binary information comprising, a magnetic element exhibiting a biaxial anisotropic characteristic defining opposite remanent stable states of flux orientation along a first easy axis of magnetization and in quadrature with said first easy axis opposite remanent stable states of flux orientation along a second easy axis of magnetization, said element defining a portion of a flux path only in any direction of remanent flux orientation, first means including a first conductor coupling said element in alignment with said first easy axis for applying a field of predetermined magnitude along the second easy axis to switch said element from orientation along said first easy axis to a stable oriented state along said second easy axis and second means including a second conductor coupling said element in quadrature with said first conductor operative in non-coincident time relationship with said first means for thereafter applying a field of predetermined magnitude along the first easy axis to switch said element from orientation along said second easy axis to stable orientation along said first easy axis.

11. Apparatus for storing binary information comprising, a magnetic element exhibiting a biaxial anisotropic characteristic defining opposite remanent stable states of flux orientation along a first easy axis of magnetization and angularly displaced therefrom, opposite remanent stable states of flux orientation along a second easy axis of magnetization, said element defining a portion of a flux path only in any direction of flux orientation therein, first means including a first conductor coupling said element for applying a field of predetermined magnitude along said second easy axis to switch said element from orientation along said first easy axis to a stable oriented state along said second easy axis and means including a second winding coupling said element operative in non-coincident time relationship with said first means for thereafter applying a field of predetermined magnitude along said first easy axis to switch said element from orientation along said second easy axis to stable orientation along said first easy axis.

12. Apparatus for storing binary information comprising, a magnetic element exhibiting a biaxial anisotropic characteristic defining opposite remanent stable states of flux orientation along a first easy axis of magnetization and angularly displaced from said first easy axis opposite remanent stable states of flux orientation along a second easy axis of magnetization, first means for applying a field of predetermined magnitude directed along said second easy axis to switch said element from orientation along said first easy axis to a stable oriented state along said second easy axis and means operative in non-coincident time relationship with said first means for thereafter applying a field of predetermined magnitude directed along said first easy axis to switch said element from orientation along said second easy axis to orientation along said first easy axis.

13. Apparatus as set forth in claim 12, wherein said magnetic element exhibits a simple biaxial anisotropic characteristic.

14. Apparatus as set forth in claim 12, wherein said magnetic element exhibits a complex biaxial anisotropic characteristic.

References Cited in the file of this patent

"Communications and Electronics," January 1954, pp. 822–830.